(12) United States Patent
Suzuki et al.

(10) Patent No.: US 11,083,008 B2
(45) Date of Patent: Aug. 3, 2021

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, New Territories (HK)

(72) Inventors: Shoichi Suzuki, Sakai (JP); Tomoki Yoshimura, Sakai (JP); Tatsushi Aiba, Sakai (JP); Wataru Ouchi, Sakai (JP); Takashi Hayashi, Sakai (JP); Liqing Liu, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 289 days.

(21) Appl. No.: 16/305,419

(22) PCT Filed: May 31, 2017

(86) PCT No.: PCT/JP2017/020194
§ 371 (c)(1),
(2) Date: Nov. 29, 2018

(87) PCT Pub. No.: WO2017/209164
PCT Pub. Date: Dec. 7, 2017

(65) Prior Publication Data
US 2020/0329490 A1  Oct. 15, 2020

(30) Foreign Application Priority Data

Jun. 3, 2016  (JP) .............................. JP2016-111855

(51) Int. Cl.
*H04W 72/14*  (2009.01)
*H04B 7/06*  (2006.01)
(Continued)

(52) U.S. Cl.
CPC .......... *H04W 72/14* (2013.01); *H04B 7/0626* (2013.01); *H04L 1/1812* (2013.01);
(Continued)

(58) Field of Classification Search
CPC .............. H04W 72/14; H04W 72/0413; H04B 7/0626; H04L 1/1812; H04L 5/001; H04L 5/0055
See application file for complete search history.

(56) References Cited

U.S. PATENT DOCUMENTS 8,917,603 B2 * 12/2014 Yang ..................... H04J 3/1694
370/235
9,391,736 B2 * 7/2016 Nayeb Nazar ........ H04W 24/10
(Continued)

FOREIGN PATENT DOCUMENTS

EP      3024269 A1   5/2016
JP   2015-092716 A   5/2015
(Continued)

OTHER PUBLICATIONS

Official Communication issued in International Patent Application No. PCT/JP2017/020194, dated Jun. 27, 2017.
(Continued)

*Primary Examiner* — Michael J Moore, Jr.
(74) *Attorney, Agent, or Firm* — Finnegan, Henderson, Farabow, Garrett & Dunner LLP

(57) ABSTRACT

A terminal apparatus receives an uplink grant used to schedule a PUSCH; transmits, in a case that an HARQ-ACK request included in the uplink grant is set so as to trigger transmission of an HARQ-ACK, the HARQ-ACK on the PUSCH corresponding to the uplink grant; and transmits, in a case that a CSI request included in the uplink grant is set so as to trigger a CSI report, an RI on the PUSCH corresponding to the uplink grant, in which an index of an
(Continued)

SC-FDMA symbol in which the RI is transmitted is provided based on a value of the HARQ-ACK request.

20 Claims, 9 Drawing Sheets

(51) Int. Cl.
*H04L 1/18* (2006.01)
*H04L 5/00* (2006.01)
*H04W 72/04* (2009.01)

(52) U.S. Cl.
CPC ............ *H04L 5/001* (2013.01); *H04L 5/0055* (2013.01); *H04W 72/0413* (2013.01)

(56) References Cited

U.S. PATENT DOCUMENTS

| | | | |
|---|---|---|---|
| 2011/0249578 A1* | 10/2011 | Nayeb Nazar | H04L 5/0053 370/252 |
| 2015/0124665 A1* | 5/2015 | Park | H04J 4/00 370/280 |
| 2015/0163794 A1* | 6/2015 | Liang | H04W 72/0413 370/329 |
| 2015/0215079 A1* | 7/2015 | Park | H04L 1/1854 370/280 |
| 2016/0066282 A1 | 3/2016 | Ouchi et al. | |
| 2016/0234829 A1 | 8/2016 | Takahashi et al. | |
| 2018/0310298 A1* | 10/2018 | Li | H04L 5/0053 |
| 2019/0090258 A1* | 3/2019 | Ryu | H04B 7/0632 |
| 2019/0260550 A1* | 8/2019 | Seo | H04L 1/1864 |

FOREIGN PATENT DOCUMENTS

| | | |
|---|---|---|
| KR | 20150089714 A | 8/2015 |
| WO | 2015/008830 A1 | 1/2015 |

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.1.0, Mar. 2016, pp. 1-155.

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.1.0, Mar. 2016, pp. 1-129.

"3rd Generation Partnership Project; Technical Specification Group Radio Access Network; Evolved Universal Terrestrial Radio Access (E-UTRA); Physical layer procedures (Release 13)", 3GPP TS 36.213 V13.1.1, Mar. 2016, pp. 1-361.

Ericsson et al., "New Work Item on enhanced LAA for LTE", 3GPP TSG RAN Meeting #70, RP-152272, Dec. 7-10, 2016, 8 pages.

Sharp, "UCI transmission on LAA carrier", 3GPP TSG RAN WG1 Meeting #85, R1-164994, May 23-27, 2016, pp. 1-4.

Ericsson et al., "New Work Item on enhanced LAA for LTE", 3GPP TSG RAN Meeting #70, RP-152272, Dec. 7-10, 2015, 8 pages.

* cited by examiner

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-111855 filed on Jun. 3, 2016, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE: registered trademark)", or "Evolved Universal Terrestrial Radio Access (EUTRA)") have been studied. In LTE, a base station apparatus is also referred to as an evolved NodeB (eNodeB), and a terminal apparatus is also referred to as User Equipment (UE). LTE is a cellular communication system in which multiple areas are deployed in a cellular structure, with each of the multiple areas being covered by a base station apparatus. A single base station apparatus may manage multiple cells.

In LTE release 13, carrier aggregation which is a technology in which a terminal apparatus performs simultaneous transmission and/or reception in multiple serving cells (component carriers) (Non Patent Literature 1, 2, and 3), has been specified. In LTE release 14, function expansion of a Licensed Assisted Access (LAA) and carrier aggregation using an uplink carrier in an unlicensed band have been studied (Non Patent Literature 4). Non Patent Literature 5 discloses that, based on a trigger by a base station apparatus, an HARQ-ACK feedback with respect to an uplink carrier in an unlicensed band is transmitted by a PUSCH.

CITATION LIST

Non Patent Literature

NPL 1: "3GPP TS 36.211 V13.1.0 (2016 March)", 29 Mar. 2016.
NPL 2: "3GPP TS 36.212 V13.1.0 (2016 March)", 29 Mar. 2016.
NPL 3: "3GPP TS 36.213 V13.1.1 (2016 March)", 31 Mar. 2016.
NPL 4: "New Work Item on enhanced LAA for LTE", RP-152272, Ericsson, Huawei, 3GPP TSG RAN Meeting #70, Sitges, Spain, 7-10 Dec. 2015.
NPL 5: "UCI transmission on LAA carrier", R1-164994, Sharp, 3GPP TSG RAN1 Meeting #85, Nanjing, China, 23-27 May 2016.

SUMMARY OF INVENTION

Technical Problem

An aspect of the present invention provides a terminal apparatus capable of efficiently performing uplink transmission, a communication method used by the terminal apparatus, an integrated circuit mounted on the terminal apparatus, a base station apparatus capable of efficiently receiving the uplink transmission, a communication method used by the base station apparatus, and an integrated circuit mounted on the base station apparatus.

Solution to Problem (1) According to some aspects of the present invention, the following measures are provided. That is, a first aspect of the present invention is a terminal apparatus, the terminal apparatus includes: a receiver configured to receive an uplink grant used to schedule a PUSCH; and a transmitter configured to transmit, in a case that an HARQ-ACK request included in the uplink grant is set so as to trigger transmission of an HARQ-ACK, the HARQ-ACK on the PUSCH corresponding to the uplink grant, and configured to transmit, in a case that a CSI request included in the uplink grant is set so as to trigger a CSI report, an RI on the PUSCH corresponding to the uplink grant, in which an index of an SC-FDMA symbol in which the RI is transmitted is provided based on a value of the HARQ-ACK request.

(2) A second aspect of the present invention is a base station apparatus, the base station apparatus includes: a transmitter configured to transmit an uplink grant used to schedule a PUSCH; and a receiver configured to receive, in a case that an HARQ-ACK request included in the uplink grant is set so as to trigger transmission of an HARQ-ACK, the HARQ-ACK on the PUSCH corresponding to the uplink grant, and configured to receive, in a case that a CSI request included in the uplink grant is set so as to trigger a CSI report, an RI on the PUSCH corresponding to the uplink grant, in which an index of an SC-FDMA symbol in which the RI is transmitted is provided based on a value of the HARQ-ACK request.

(3) A third aspect of the present invention is a communication method used by a terminal apparatus, the communication method includes the steps of: receiving an uplink grant used to schedule a PUSCH; transmitting, in a case that an HARQ-ACK request included in the uplink grant is set so as to trigger transmission of an HARQ-ACK, the HARQ-ACK on the PUSCH corresponding to the uplink grant; and transmitting, in a case that a CSI request included in the uplink grant is set so as to trigger a CSI report, an RI on the PUSCH corresponding to the uplink grant, in which an index of an SC-FDMA symbol in which the RI is transmitted is provided based on a value of the HARQ-ACK request.

(4) A fourth aspect of the present invention is a communication method used by a base station apparatus, the communication method includes the steps of: transmitting an uplink grant used to schedule a PUSCH; receiving, in a case that an HARQ-ACK request included in the uplink grant is set so as to trigger transmission of an HARQ-ACK, the HARQ-ACK on the PUSCH corresponding to the uplink grant; and receiving, in a case that a CSI request included in the uplink grant is set so as to trigger a CSI report, an RI on the PUSCH corresponding to the uplink grant, in which an index of an SC-FDMA symbol in which the RI is transmitted is provided based on a value of the HARQ-ACK request.

(5) A fifth aspect of the present invention is an integrated circuit mounted on a terminal apparatus, the integrated circuit includes: a reception circuit configured to receive an uplink grant used to schedule a PUSCH; and a transmission circuit configured to transmit, in a case that an HARQ-ACK request included in the uplink grant is set so as to trigger transmission of an HARQ-ACK, the HARQ-ACK on the PUSCH corresponding to the uplink grant, and configured to transmit, in a case that a CSI request included in the uplink grant is set so as to trigger a CSI report, an RI on the PUSCH corresponding to the uplink grant, in which an index of an SC-FDMA symbol in which the RI is transmitted is provided based on a value of the HARQ-ACK request.

(6) A sixth aspect of the present invention is an integrated circuit mounted on a base station apparatus, the integrated circuit includes: a transmission circuit configured to transmit an uplink grant used to schedule a PUSCH; and a reception circuit configured to receive, in a case that an HARQ-ACK request included in the uplink grant is set so as to trigger transmission of an HARQ-ACK, the HARQ-ACK on the PUSCH corresponding to the uplink grant, and configured to receive, in a case that a CSI request included in the uplink grant is set so as to trigger a CSI report, an RI on the PUSCH corresponding to the uplink grant, in which an index of an SC-FDMA symbol in which the RI is transmitted is provided based on a value of the HARQ-ACK request.

Advantageous Effects of Invention

According to an aspect of the present invention, a terminal apparatus can efficiently perform uplink transmission. Additionally, a base station apparatus can efficiently receive the uplink transmission.

DESCRIPTION OF EMBODIMENTS

Embodiments of the present invention will be described below.

Figure 1:
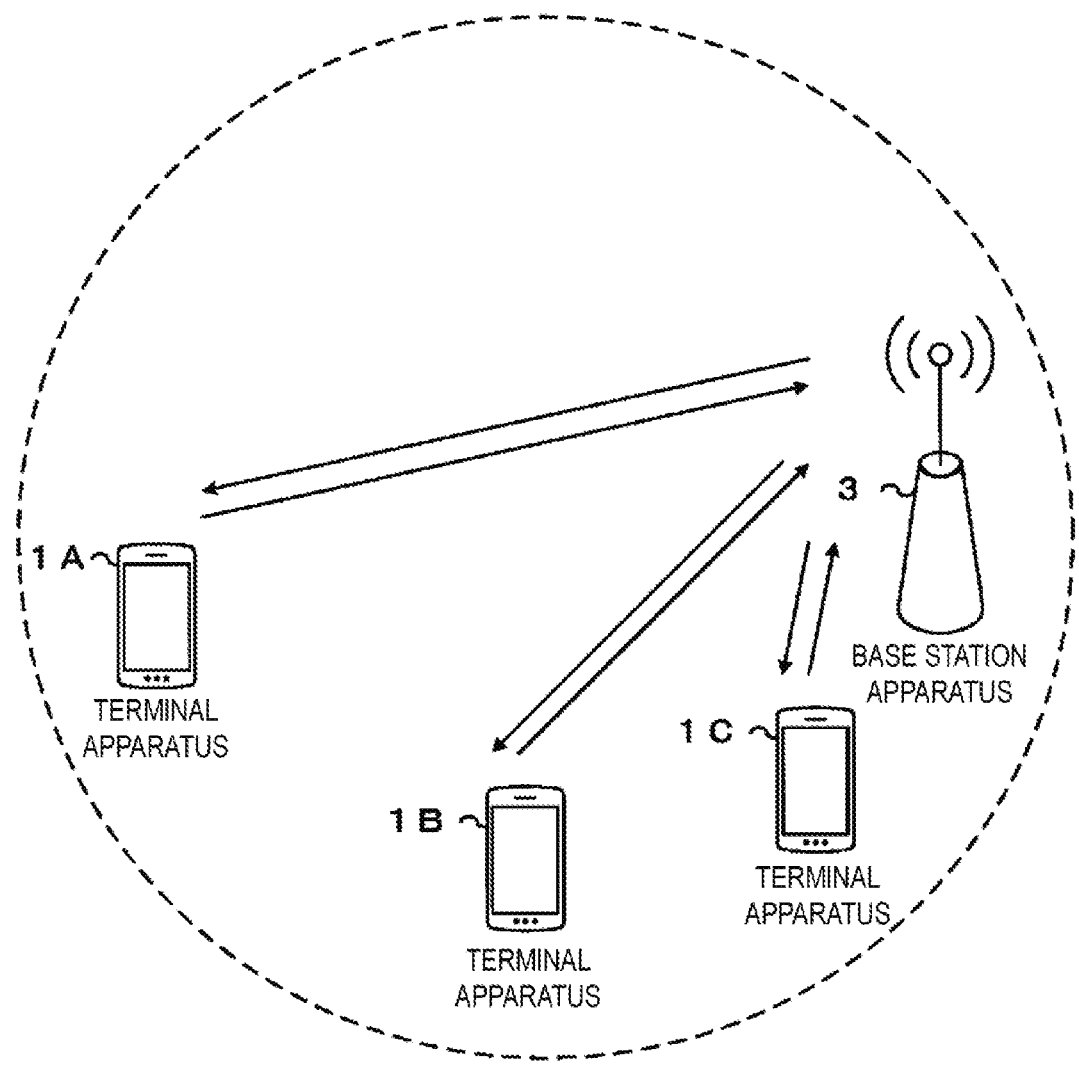
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. Hereinafter, each of the terminal apparatuses 1A to 1C is referred to as a terminal apparatus 1.

Carrier aggregation will be described below.

In the present embodiment, multiple serving cells are configured for the terminal apparatus 1. A technology in which the terminal apparatus 1 communicates via the multiple serving cells is referred to as cell aggregation or carrier aggregation. An aspect of the present invention may be applied to each of the multiple serving cells configured for the terminal apparatus 1. Furthermore, an aspect of the present invention may be applied to some of the configured multiple serving cells. Furthermore, an aspect of the present invention may be applied to each group of the configured multiple serving cells. Furthermore, an aspect of the present invention may be applied to some groups of the configured multiple serving cells. The multiple serving cells include at least one primary cell. The multiple serving cells may include one or multiple secondary cells. The multiple serving cells may include one or multiple Licensed Assisted Access (LAA) cells. The LAA cell is also referred to as an LAA secondary cell.

The primary cell is a serving cell in which an initial connection establishment procedure has been performed, a serving cell in which a connection re-establishment procedure has been started, or a cell indicated as a primary cell during a handover procedure. The secondary cell(s) and/or the LAA cell(s) may be configured at a point in time when or after a Radio Resource Control (RRC) connection is established. The primary cell may be included in a licensed band. The LAA cell may be included in an unlicensed band. The secondary cell may be included in either the licensed band or the unlicensed band. The LAA cell may also be referred to as the LAA secondary cell.

A carrier corresponding to the serving cell in downlink is referred to as a downlink component carrier. A carrier corresponding to the serving cell in uplink is referred to as an uplink component carrier. The downlink component carrier and the uplink component carrier are collectively referred to as a component carrier.

The terminal apparatus 1 can perform simultaneous transmission and/or reception on multiple physical channels in multiple serving cells (component carriers). A single physical channel is transmitted in a single serving cell (component carrier) of the multiple serving cells (component carriers).

Physical channels and physical signals according to the present embodiment will be described.

In FIG. 1, in uplink radio communication from the terminal apparatus 1 to the base station apparatus 3, the following uplink physical channels are used. The uplink physical channels are used for transmission of information output from higher layers.

Physical Uplink Shared CHannel (PUSCH)
Physical Random Access CHannel (PRACH)

The PUSCH is used for transmission of uplink data (Transport block, Uplink-Shared CHannel (UL-SCH)), Channel State Information (CSI) and/or a Hybrid Automatic Repeat reQuest (HARQ-ACK) of the downlink. Each of the CSI and the HARQ-ACK are Uplink Control Information (UCI).

The CSI includes a Channel Quality Indicator (CQI), a Rank Indicator (RI), and a Precoding Matrix Indicator (PMI). The CQI expresses a combination of a modulation scheme and a coding rate for a single transport block to be transmitted on a PDSCH. The RI indicates the number of effective layers determined by the terminal apparatus 1. The PMI indicates a code book determined by the terminal apparatus 1. The code book relates to precoding of the PDSCH.

The HARQ-ACK corresponds to downlink data (Transport block, Medium Access Control Protocol Data Unit (MAC PDU), Downlink-Shared CHannel (DL-SCH), Physical Downlink Shared CHannel (PDSCH)). The HARQ-ACK indicates an acknowledgement (ACK) or a negative-acknowledgement (NACK). The HARQ-ACK is also referred to as ACK/NACK, HARQ feedback, HARQ acknowledge, HARQ information, or HARQ control information.

The PRACH is used to transmit a random access preamble.

In FIG. 1, the following uplink physical signal is used in the uplink radio communication. The uplink physical signal is not used for transmission of information output from the higher layer, but is used by the physical layer.

Demodulation Reference Signal (DMRS)

The DMRS is associated with transmission of the PUSCH. The DMRS is time-multiplexed with the PUSCH. The base station apparatus 3 may use the DMRS in order to perform channel compensation of the PUSCH.

In FIG. 1, the following downlink physical channel is used for downlink radio communication from the base station apparatus 3 to the terminal apparatus 1. The downlink physical channel is used for transmission of information output from higher layers.

Physical Downlink Control CHannel (PDCCH)

The PDCCH is used to transmit Downlink Control Information (DCI). The downlink control information is also referred to as a DCI format. The downlink control information includes an uplink grant. The uplink grant may be used for scheduling of a single PUSCH within a single cell. The uplink grant may be used for scheduling of multiple PUSCHs in consecutive subframes within a single cell. The uplink grant may be used for scheduling of a single PUSCH within the fourth or later subframe from the subframe in which the uplink grant is transmitted.

The UL-SCH is a transport channel. A channel used in a Medium Access Control (MAC) layer is referred to as a transport channel. A unit of the transport channel used in the MAC layer is also referred to as a transport block (TB) or a MAC Protocol Data Unit (PDU).

A configuration of the radio frame according to the present embodiment will be described below.

Figure 2:
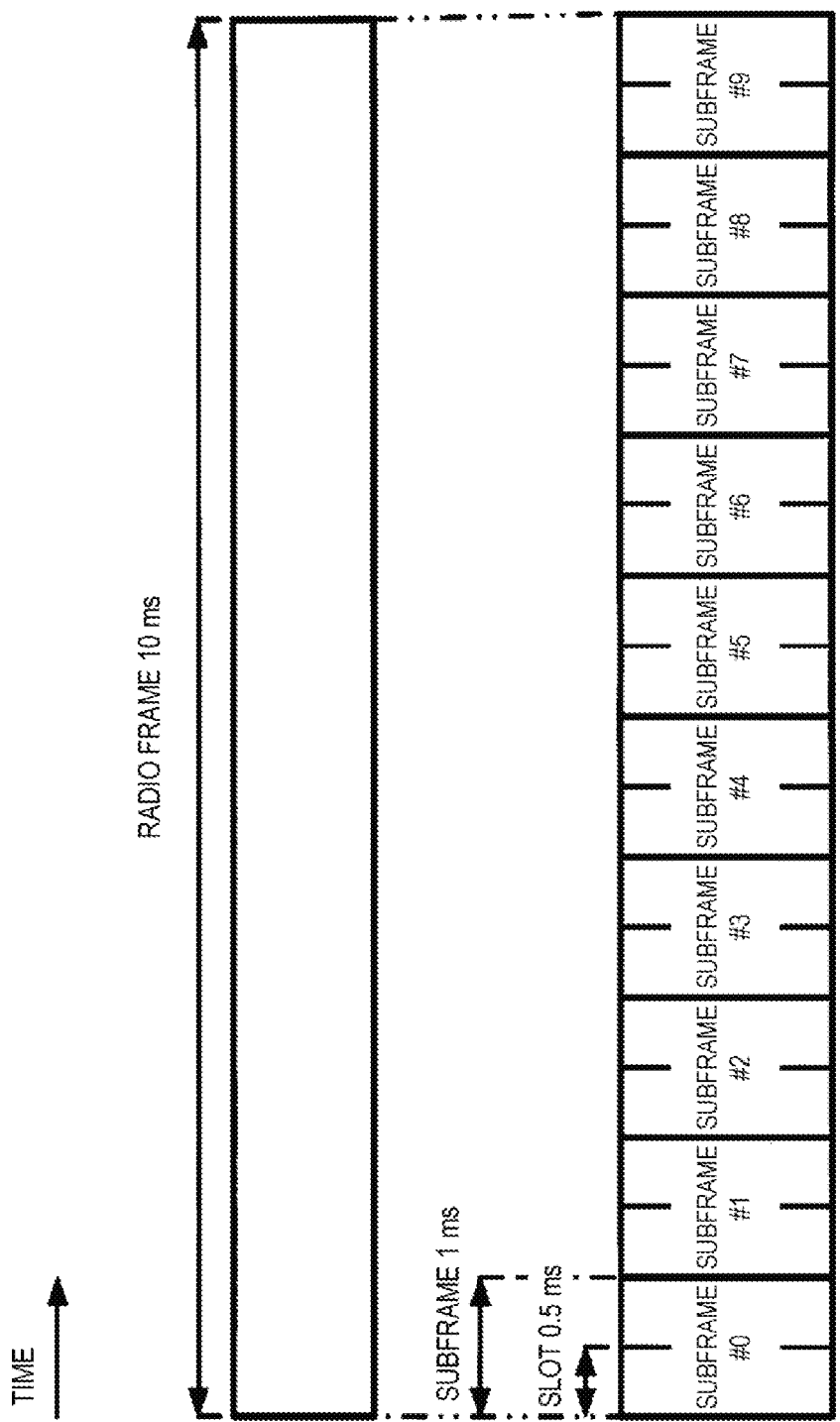
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of the radio frames is 10 ms in length. Additionally, each of the radio frames is constituted of 10 subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot. To be more precise, 10 subframes can be used at each interval of 10 ms.

Figure 3:
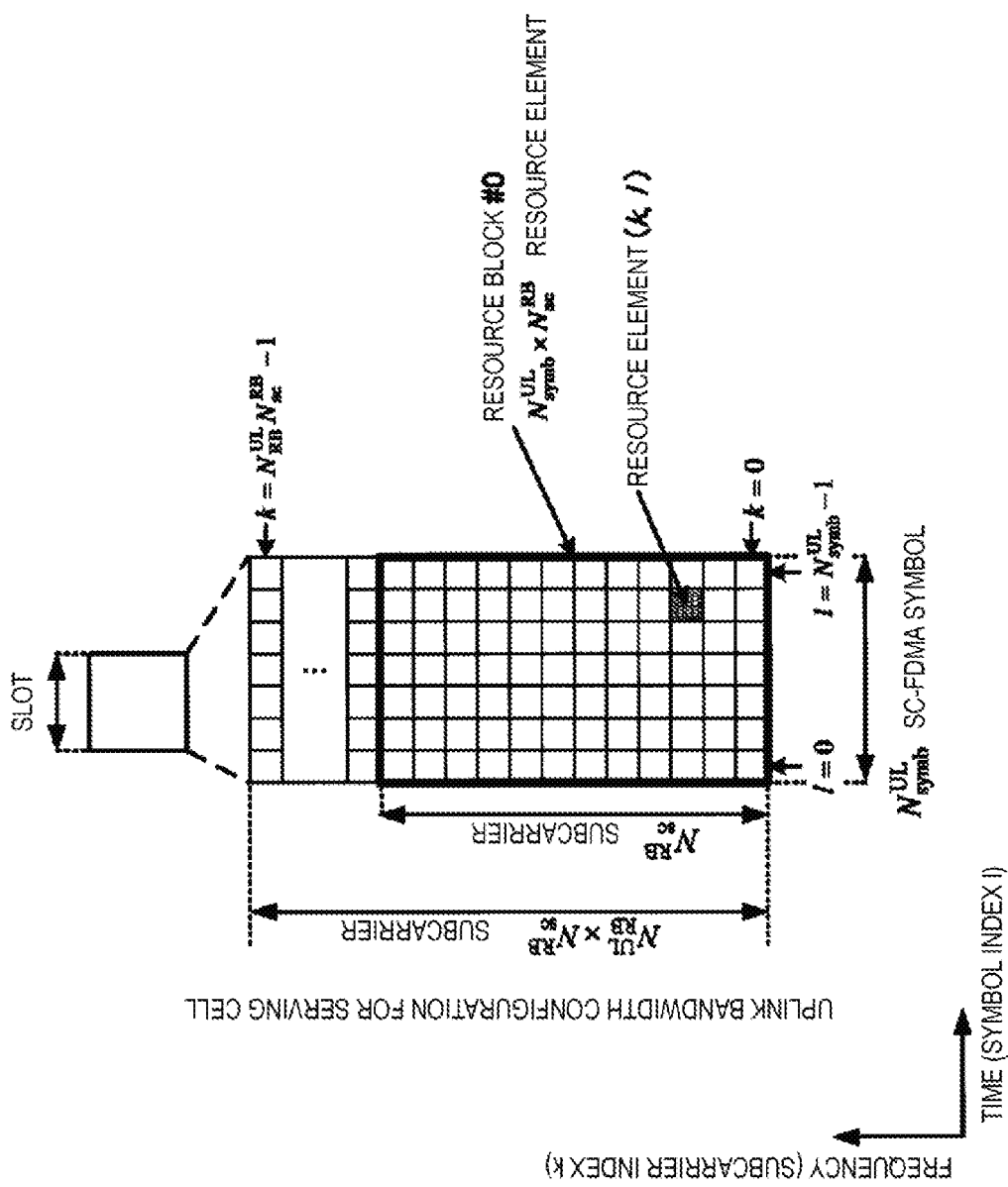
FIG. 3 is a diagram illustrating a schematic configuration of an uplink slot according to the present embodiment.

An example of a configuration of a slot according to the present embodiment will be described below. FIG. 3 is a diagram illustrating a schematic configuration of an uplink slot according to the present embodiment. FIG. 3 illustrates the configuration of the uplink slot in one cell. In FIG. 3, the horizontal axis is a time axis, and the vertical axis is a frequency axis. In FIG. 3, l is a SC-FDMA symbol number/index, and k is a subcarrier number/index.

The physical signal or the physical channel transmitted in each of the slots is expressed by a resource grid. In uplink, the resource grid is defined by multiple subcarriers and multiple SC-FDMA symbols. Each element within the resource grid is referred to as a resource element. The resource element is expressed by the subcarrier number/index k and the SC-FDMA symbol number/index l.

The uplink slot includes multiple SC-FDMA symbols l (l=0, 1, . . . , $N^{UL}_{symb}$) in the time domain. $N^{UL}_{symb}$ indicates the number of SC-FDMA symbols included in one uplink slot. For a normal Cyclic Prefix (CP) in the uplink, $N^{UL}_{symb}$ is 7. For an extended CP in the uplink, $N^{UL}_{symb}$ is 6.

The terminal apparatus 1 receives a parameter UL-CyclicPrefixLength indicating a CP length in the uplink from the base station apparatus 3. The base station apparatus 3 may broadcast system information including the parameter UL-CyclicPrefixLength corresponding to a cell, in the cell.

The uplink slot includes multiple subcarriers k (k=0, 1, . . . , $N^{UL}_{RB} \times N^{RB}_{sc}$) in the frequency domain. $N^{UL}_{RB}$ is an uplink bandwidth configuration for the serving cell, which is expressed by a multiple of $N^{RB}_{sc}$. $N^{RB}_{sc}$ is a (physical) resource block size in the frequency domain, which is expressed by the number of subcarriers. The subcarrier interval Δf is 15 kHz, $N^{RB}_{sc}$ may be 12. In other words, $N^{RB}_{sc}$ may be 180 kHz.

A resource block (RB) is used to express mapping of a physical channel to resource elements. For the resource block, a virtual resource block (VRB) and a physical resource block (PRB) are defined. A physical channel is first mapped to a virtual resource block. Thereafter, the virtual resource block is mapped to the physical resource block. One physical resource block is defined by $N^{UL}_{symb}$ consecutive SC-FDMA symbols in the time domain and by $N^{RB}_{sc}$ consecutive subcarriers in the frequency domain. Hence, one physical resource block includes ($N^{UL}_{symb} \times N^{RB}_{sc}$) resource elements. One physical resource block corresponds to one slot in the time domain. Physical resource blocks are numbered with a number $n_{PRB}$ (0, 1, . . . , $N^{UL}_{RB}-1$) in ascending order of the frequency in the frequency domain.

A downlink slot in the present embodiment includes multiple OFDM symbols. A configuration of the downlink slot in the present embodiment is basically the same as the above description excluding a point that the resource grid is defined by multiple subcarriers and multiple OFDM symbols, and thus descriptions of the configuration of the downlink slot will be omitted.

Configurations of apparatuses according to the present embodiment will be described below.

Figure 4:
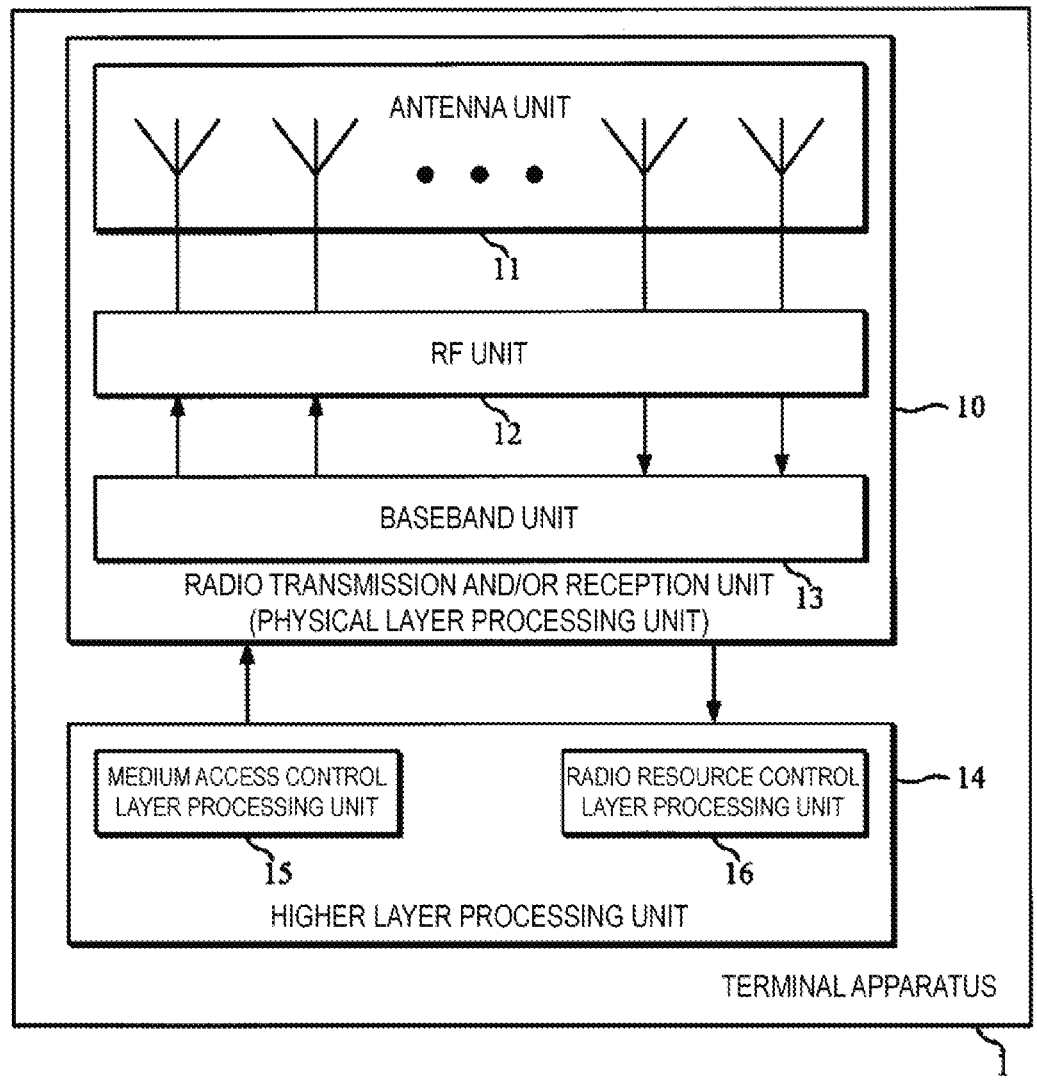
FIG. 4 is a schematic block diagram illustrating a configuration of a terminal apparatus 1 in the present embodiment.

FIG. 4 is a schematic block diagram illustrating a configuration of the terminal apparatus 1 in the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs the uplink data (transport block) generated by a user operation or the like, to the radio transmission and/or reception unit 10. The higher layer processing unit 14 performs processing of the Medium Access Control (MAC) layer, a Packet Data Convergence Protocol (PDCP) layer, a Radio Link Control (RLC) layer, and a Radio Resource Control (RRC) layer.

The medium access control layer processing unit 15 included in the higher layer processing unit 14 performs processing of the Medium Access Control layer. The medium access control layer processing unit 15 controls a random access procedure in accordance with various types of configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages the various types of configuration information/parameters of the terminal apparatus 1. The radio resource control layer processing unit 16 sets the various types of configuration information/parameters, based on higher layer signaling received from the base station apparatus 3. Specifically, the radio resource control layer processing unit 16 sets the various types of configuration information/parameters in accordance with information indicating the various types of configuration information/parameters received from the base station apparatus 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 modulates and codes data to generate a transmit signal, and transmits the transmit signal to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 performs Inverse Fast Fourier Transform (IFFT) on the data, generates an SC-FDMA symbol, attaches the CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 5:
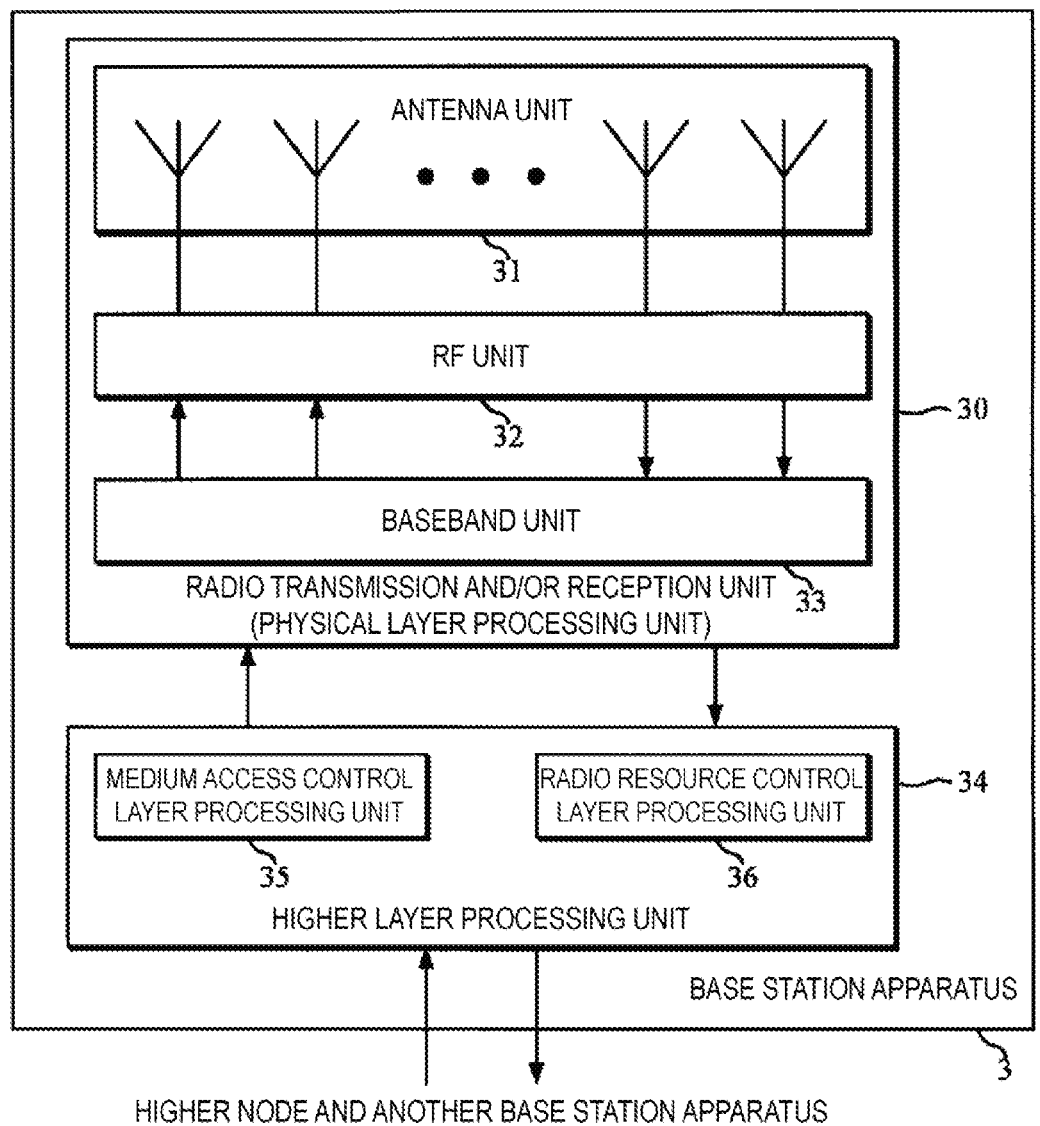
FIG. 5 is a schematic block diagram illustrating a configuration of a base station apparatus 3 in the present embodiment.

FIG. 5 is a schematic block diagram illustrating a configuration of the base station apparatus 3 in the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 controls the random access procedure in accordance with the various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and outputs the generated or acquired data to the radio transmission and/or reception unit 30. Furthermore, the radio resource control layer processing unit 36 manages the various types of configuration information/parameters for each of the terminal apparatuses 1. The radio resource control layer processing unit 36 may set the various types of configuration information/parameters for each of the terminal apparatuses 1 via the higher layer signaling. In other words, the radio resource control layer processing unit 36 transmits/broadcasts the information indicating the various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

The random access procedures will be described below.

In the present embodiment, the random access procedure may be performed in the primary cell, the secondary cell, or the LAA cell. However, only one random access procedure is performed at a point in the time domain. That is, multiple random access procedures are not performed simultaneously.

According to the present embodiment, either of a contention based random access procedure and a non-contention based random access procedure may be performed on the primary cell. In the secondary cell and the LAA cell, the non-contention based random access procedure may be performed.

A random access preamble may be transmitted on the PRACH on the primary cell, the secondary cell, or the LAA cell. The terminal apparatus 1 receives from the base station apparatus 3 information (RRC message) on the random access procedure. The information on the random access procedure includes information indicating a set of PRACH resources.

In the contention based random access procedure, the terminal apparatus 1 itself randomly selects a random access preamble index. In the non-contention based random access procedure, the random access preamble index is selected by the terminal apparatus 1 based on the information received from the base station apparatus 3.

A random access response for the primary cell, the secondary cell, or the LAA cell is transmitted on the PDSCH on the primary cell. The random access response for a certain cell corresponds to a random access preamble transmitted in the certain cell. The PDCCH corresponding to the PDSCH including the random access response (DL-SCH, transport block) includes a Random Access-Radio Network Identifier (RA-RNTI). The PDCCH includes the downlink control information (downlink grant).

The random access response includes an uplink grant field which is mapped in an uplink grant, a Temporary Cell Radio Network Temporary Identifier (C-RNTI) field which is mapped in information for indicating a Temporary C-RNTI, and a Timing Advance (TA) command. The uplink grant included in the random access response is also referred to as a random access response grant. The terminal apparatus 1 adjusts a PUSCH transmission timing based on the TA command. For each cell group, the PUSCH transmission timing may be adjusted.

In a case that the received random access response includes a random access preamble identifier corresponding to the transmitted random access preamble and the random access preamble is selected by the terminal apparatus 1 based on the information received from the base station apparatus 3, the terminal apparatus 1 determines that the non-contention based random access procedure has been successfully completed and transmits the transport block on the PUSCH based on the random access response grant.

In a case that the received random access response includes the random access preamble identifier corresponding to the transmitted random access preamble and the terminal apparatus 1 itself randomly selects the random access preamble, the terminal apparatus 1 sets the Temporary C-RNTI as the value in the Temporary C-RNTI field and transmits a random access message 3 (transport block) on the PUSCH based on the uplink grant included in the random access response.

The PUSCH corresponding to the uplink grant included in the random access response is transmitted on the serving cell on which the corresponding preamble has been transmitted on the PRACH.

After transmitting the message 3, the terminal apparatus 1 receives a contention resolution. Based on the reception of the contention resolution, the terminal apparatus 1 determines that the contention based random access procedure has been successfully completed.

In the present embodiment, a group of multiple LAA cells is referred to as a UCI cell group. The HARQ-ACK for the multiple LAA cells included in the UCI cell group is transmitted on the PUSCH in one or multiple LAA cells in the UCI cell group.

The primary cell is not included in the UCI cell group all the time. The base station apparatus 3 may determine whether the LAA cell is included in the UCI cell group. The base station apparatus 3 may transmit information/a higher layer parameter indicating whether the LAA cell is included in the UCI group to the terminal apparatus 1.

The uplink grant for the LAA cell included in the UCI cell group may include the CSI request and the HARQ-ACK request. A field mapped to bits of the CSI request is also referred to as a CSI request field. A field mapped to bits of the HARQ-ACK request is also referred to as a HARQ-ACK request field.

In a case that the HARQ-ACK request field included in the uplink grant for the LAA cell included in the UCI cell group is set so as to trigger HARQ-ACK transmission, the terminal apparatus 1 transmits the HARQ-ACK using the PUSCH in the LAA cell. For example, in a case that a 1-bit HARQ-ACK request field is set to '0', the HARQ-ACK transmission may not be triggered. For example, in a case that the 1-bit HARQ-ACK request field is set to '1', the HARQ-ACK transmission may be triggered.

In a case that the CSI request field included in the uplink grant for the LAA cell included in the UCI cell group is set so as to trigger a CSI report, the terminal apparatus 1 performs the CSI report using the PUSCH in the LAA cell. For example, in a case that a 2-bit CSI request field is set to '00', the CSI report may not be triggered. For example, in a case that the 2-bit CSI request field is set to a value other than '00', the CSI report may be triggered.

The uplink grant for the serving cell not included in the UCI cell group may include the CSI request. In a case that the CSI request field included in the uplink grant for the serving cell not included in the UCI cell group is set so as to trigger the CSI report, the terminal apparatus 1 performs the CSI report using the PUSCH in the serving cell not included in the UCI cell group.

The uplink grant for the serving cell not included in the UCI cell group does not include the HARQ-ACK request. The HARQ-ACK transmission for the serving cell not included in the UCI cell group may be triggered based on detection of the PDSCH transmission in the serving cell not included in the UCI cell group. The terminal apparatus 1 may transmit, using the PUSCH in the primary cell, the HARQ-ACK corresponding to the PDSCH transmission in the primary cell.

In other words, whether the uplink grant for the LAA cell includes the HARQ-ACK request may be provided based on the information/higher layer parameter indicating whether the LAA cell is included in the UCI group.

The random access response grant may include the CSI request. The CSI request included in the random access response grant associated with the contention based random access procedure is reserved. In a case that the CSI request field included in the random access response grant is not reserved and is set so as to trigger the CSI report, the terminal apparatus 1 performs the CSI report using the PUSCH in the serving cell in which the random access preamble is transmitted.

The non-contention based random access procedure in the LAA cell included in the UCI cell group may be performed for uplink synchronization of the LAA cell. In a case that the uplink synchronization is not obtained, using the PUSCH in the LAA cell included in the UCI cell group, the HARQ-ACK for the PDSCH transmission in the LAA cell included in the UCI cell group cannot be transmitted. In other words, while the non-contention based random access procedure in the LAA cell included in the UCI cell group is performed, the PDSCH transmission in the LAA cell included in the UCI cell group may not be performed. Accordingly, in order to save bits for the random access response and the random access response grant, the HARQ-ACK request may not be included in the random access response grant for the LAA cell included in the UCI cell group.

The uplink grant included in the PDCCH may indicate retransmission of the transport block that is transmitted using the PUSCH scheduled by the random access response grant. Here, the uplink grant may include the CSI request and the HARQ-ACK request.

Hereinafter, coding processing of the uplink data, the CQI/PMI, the RI, and the HARQ-ACK transmitted using the PUSCH will be described.

Figure 6:
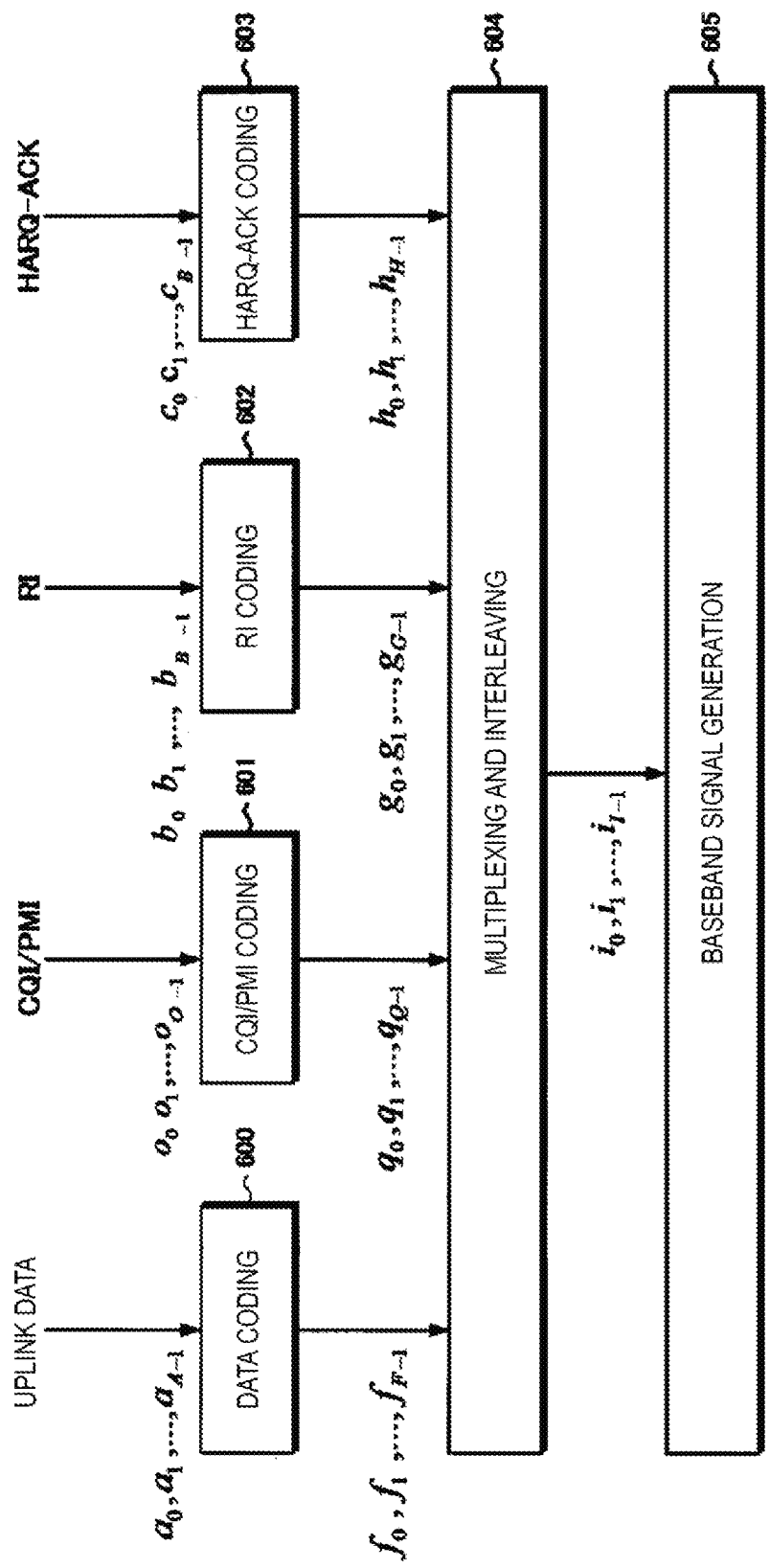
FIG. 6 is a diagram illustrating an example of coding processing of uplink data ($a_x$), a CQI/PMI ($o_x$), an RI ($a_x$), and an HARQ-ACK ($a_x$) in the present embodiment.

FIG. 6 is a diagram illustrating an example of coding processing of the uplink data ($a_x$), the CQI/PMI ($o_x$), the RI ($a_x$), and the HARQ-ACK ($a_x$) in the present embodiment. In 600 to 603 in FIG. 6, the uplink data, the CQI/PMI, the RI, and the HARQ-ACK transmitted using the PUSCH are separately coded. In 604 in FIG. 6, coded bits ($f_x$) of the uplink data, coded bits ($q_x$) of the CQI/PMI, coded bits ($g_x$) of the RI, and coded bits ($h_x$) of the HARQ-ACK are multiplexed and interleaved. In 605 in FIG. 6, from the coded bits multiplexed and interleaved in 604, a baseband signal (PUSCH signal) is generated.

For the multiplexing and interleaving of the coded bits, a matrix may be used. A column of the matrix corresponds to the SC-FDMA symbol. One element of the matrix corresponds to one coded modulation symbol. The coded modulation symbol is a group of X coded bits. Here, X is a modulation order ($Q_m$) for the PUSCH (uplink data). From one coded modulation symbol, one complex number value symbol is generated. Multiple complex number value symbols generated from multiple coded modulation symbols mapped to one column are mapped to a subcarrier allocated for the PUSCH after DFT precoding.

Figure 7:
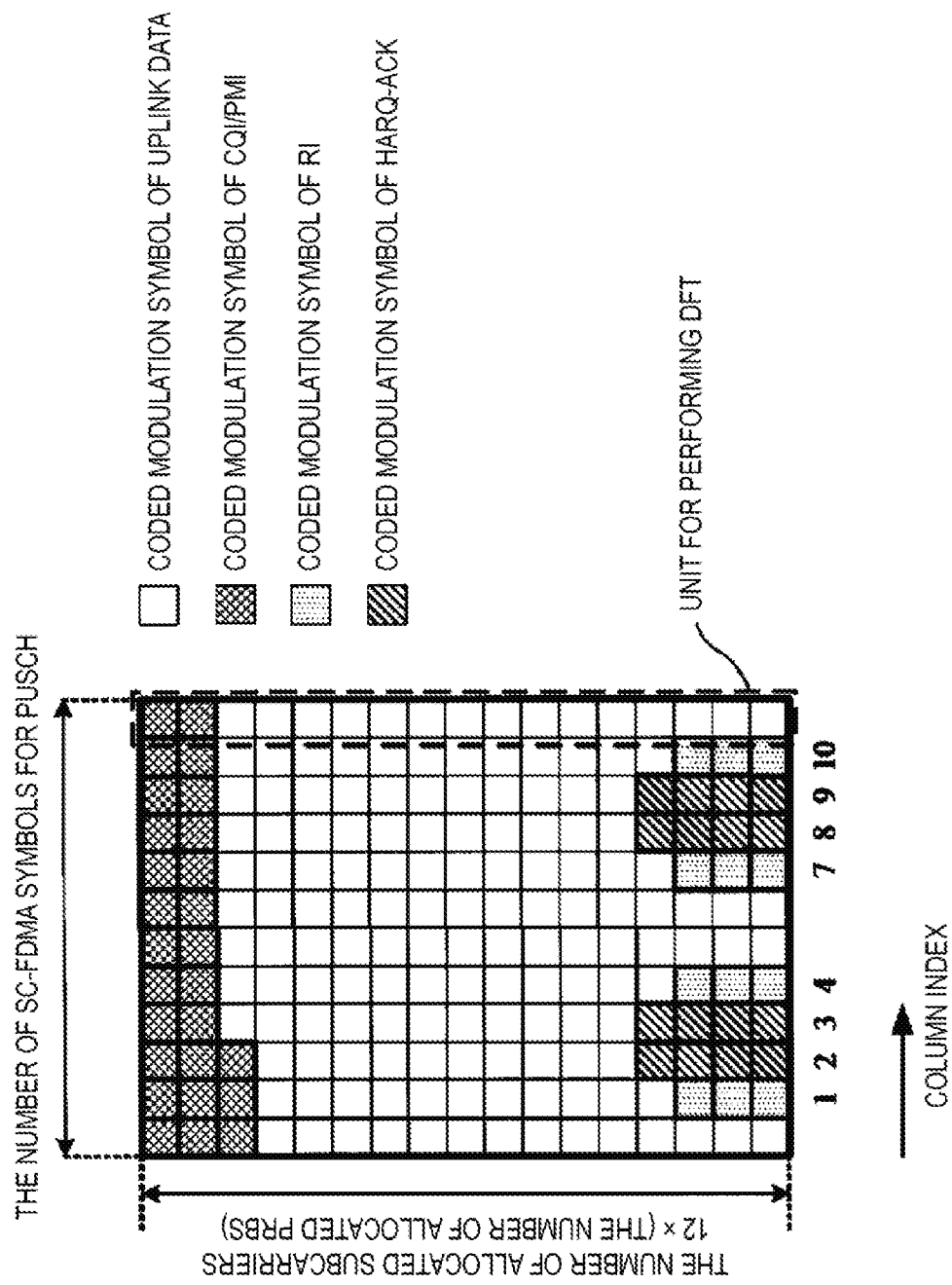
FIG. 7 is a diagram illustrating a first example of multiplexing and interleaving of coded bits in the present embodiment.

FIG. 7 is a diagram illustrating a first example of multiplexing and interleaving of coded bits in the present embodiment. In a case that the HARQ-ACK and the RI are transmitted using the PUSCH, the coded modulation symbols of the HARQ-ACK are mapped to columns of indexes {2, 3, 8, 9}, and the coded modulation symbols of the RI are mapped to columns of indexes {1, 4, 7, 10}.

Each of the columns of indexes {2, 3, 8, 9} corresponds to an SC-FDMA symbol adjacent to the SC-FDMA symbol in which the DMRS associated with the PUSCH transmission is transmitted. In the SC-FDMA symbol between the SC-FDMA symbol corresponding to the column of index 2 and the SC-FDMA symbol corresponding to the column of index 3, the DMRS is transmitted. In the SC-FDMA symbol between the SC-FDMA symbol corresponding to the column of index 8 and the SC-FDMA symbol corresponding to the column of index 9, the DMRS is transmitted. Each of the columns of indexes {1, 4, 7, 10} corresponds to an SC-FDMA symbol that is two symbols away from the SC-FDMA symbol in which the DMRS associated with the PUSCH transmission is transmitted.

With this, the HARQ-ACK is transmitted in the SC-FDMA symbol adjacent to the SC-FDMA symbol in which the DMRS is transmitted, and thus demodulation accuracy in the base station apparatus 3 is enhanced.

Figure 8:
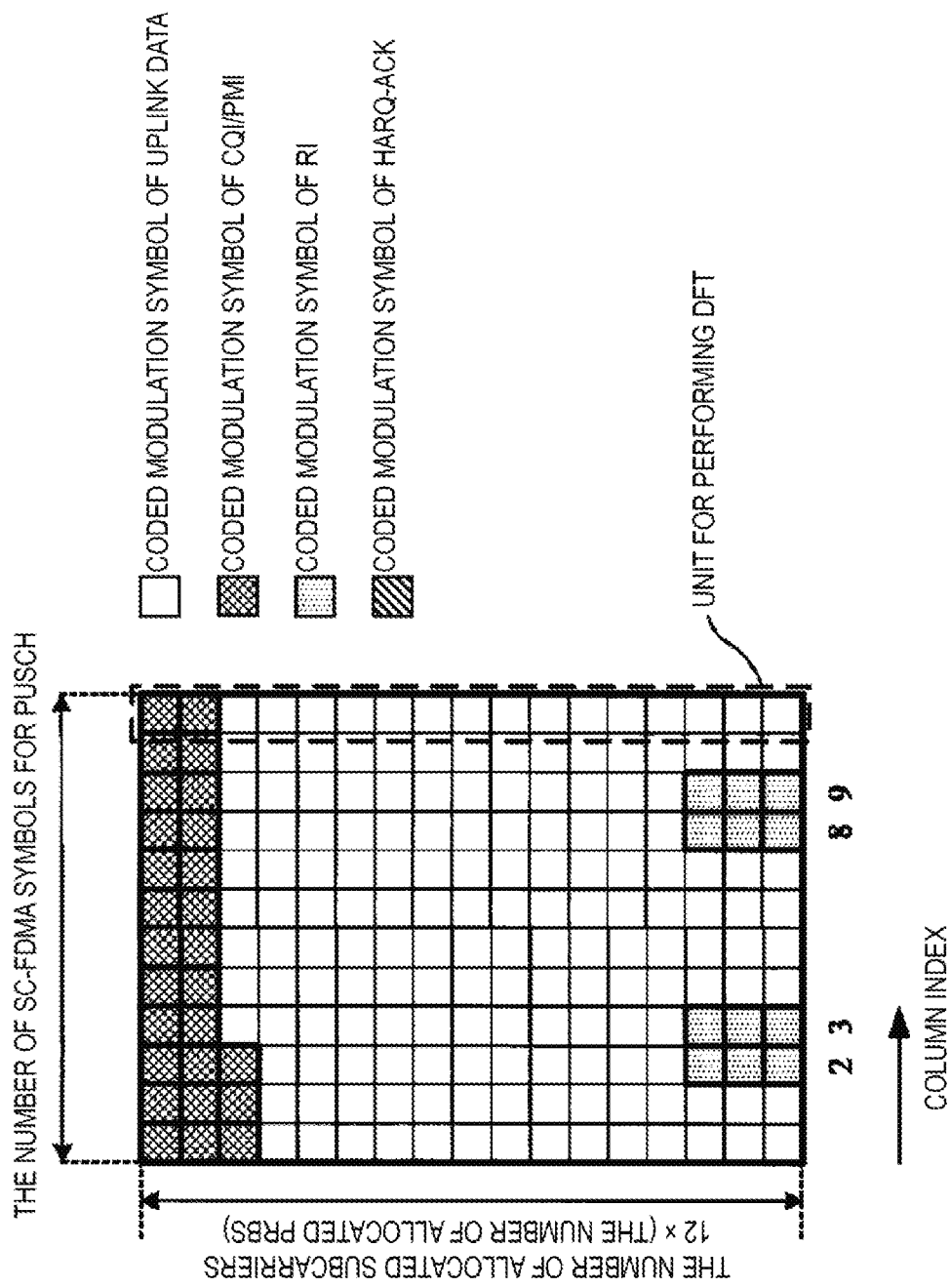
FIG. 8 is a diagram illustrating a second example of multiplexing and interleaving of coded bits in the present embodiment.
Figure 9:
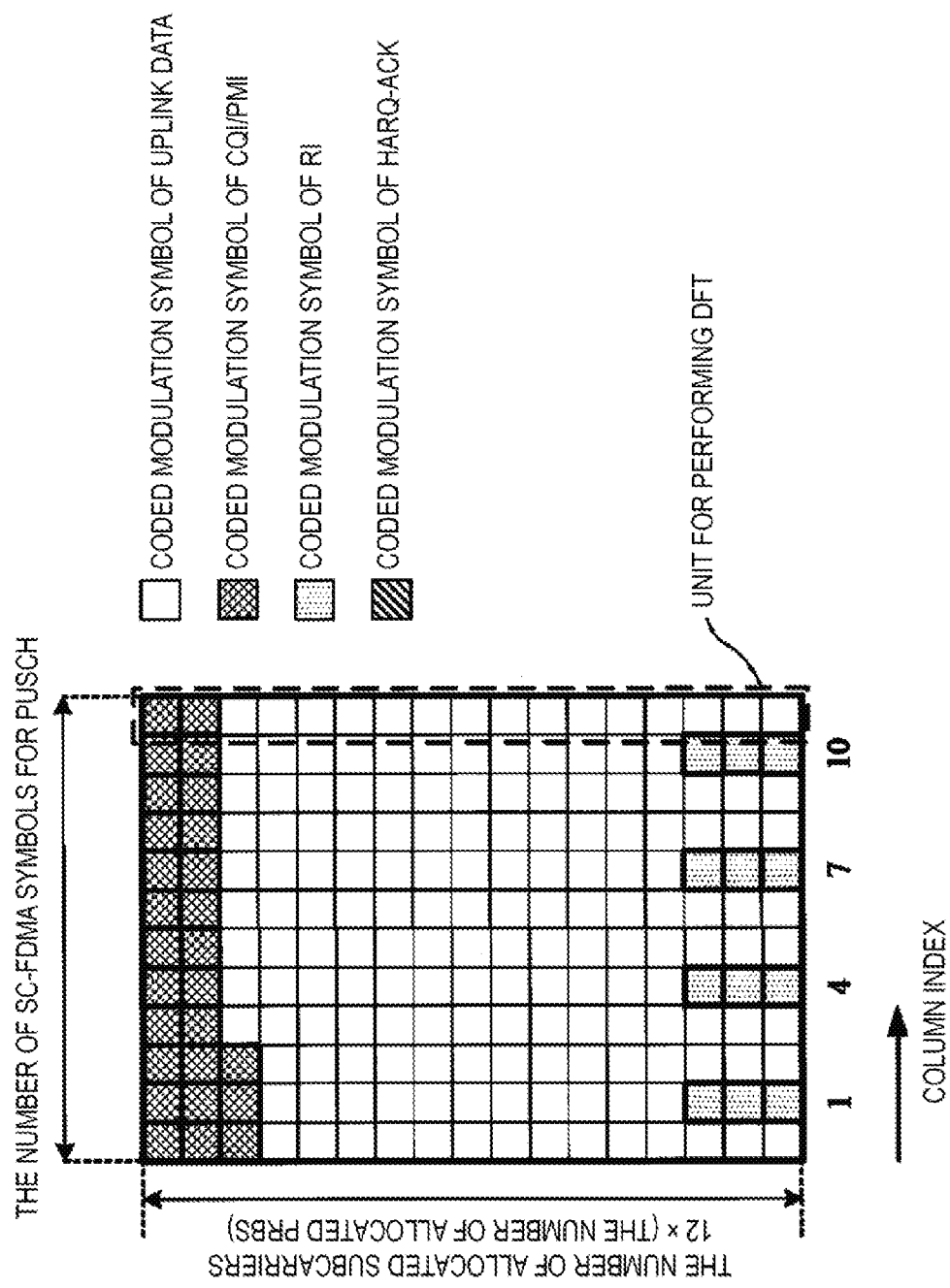
FIG. 9 is a diagram illustrating a third example of multiplexing and interleaving of coded bits in the present embodiment.

In a case that the HARQ-ACK is not transmitted using the PUSCH and the RI is transmitted using the PUSCH, the coded modulation symbols of the RI are mapped to the columns of indexes {2, 3, 8, 9} or the columns of indexes {1, 4, 7, 10}. FIG. 8 is a diagram illustrating a second example of multiplexing and interleaving of the coded bits in the present embodiment. In the second example, the coded modulation symbols of the RI are mapped to the columns of indexes {2, 3, 8, 9}. FIG. 9 is a diagram illustrating a third example of multiplexing and interleaving of the coded bits in the present embodiment. In the second example, the coded modulation symbols of the RI are mapped to the columns of indexes {1, 4, 7, 10}.

The index of the column to which the coded modulation symbol of the RI is mapped may be provided at least based on some or all of the following elements (1) to (4).

Element (1): Whether the serving cell in which the PUSCH is transmitted belongs to the UCI cell group
Element (2): Whether the HARQ-ACK transmission is performed using the PUSCH
Element (3): HARQ-ACK request field value
Element (4): the number of SC-FDMA symbols for the PUSCH The HARQ-ACK transmission using the PUSCH in the LAA cell included in the UCI cell group may be triggered based on the HARQ-ACK request field. In other words, whether the HARQ-ACK transmission using the PUSCH in the serving cell not included in the UCI cell group is performed may be provided based on the HARQ-ACK request field.

For example, in a case that the serving cell in which the PUSCH is transmitted belongs to the UCI cell group and the HARQ-ACK transmission is performed using the PUSCH, the coded modulation symbols of the RI may be mapped to the columns of indexes {1, 4, 7, 10}. For example, in a case that the serving cell in which the PUSCH is transmitted belongs to the UCI cell group and the HARQ-ACK transmission is not performed using the PUSCH, the coded modulation symbols of the RI may be mapped to the columns of indexes {2, 3, 8, 9}.

With this, in a case that the HARQ-ACK transmission is not performed using the PUSCH, the RI is transmitted in the SC-FDMA symbol adjacent to the SC-FDMA symbol in which the DMRS associated with the PUSCH transmission is transmitted, and thus demodulation accuracy of the RI can be enhanced.

The HARQ-ACK transmission using the PUSCH in the serving cell not included in the UCI cell group may be triggered based on detection of the PDSCH transmission in the serving cell not included in the UCI cell group. In other words, whether the HARQ-ACK transmission using the PUSCH in the serving cell not included in the UCI cell group is performed may be provided based on whether the PDSCH transmission in the serving cell not included in the UCI cell group is detected.

The base station apparatus 3 does not recognize whether the terminal apparatus 1 has been able to correctly detect the PDSCH transmission, and cannot therefore correctly grasp whether the HARQ-ACK transmission is performed using the PUSCH. Accordingly, in a case that the serving cell in which the PUSCH is transmitted does not belong to the UCI cell group, regardless of whether the HARQ-ACK transmission is performed using the PUSCH, the coded modulation symbols of the RI may be mapped to the columns of indexes {1, 4, 7, 10}. With this, the base station apparatus 3 can correctly grasp the SC-FDMA symbol in which the RI is transmitted.

Hereinafter, calculation methods of the number of coded bits of the RI (G) and the number of coded bits of the HARQ-ACK (H) will be described. The number of coded bits of the RI (G) and the number of coded bits of the HARQ-ACK (H) may be provided by the following Equation (1) and Equation (2).

For RI, $G = Q_m \times Q'$

For HARQ-ACK, $H = Q_m \times Q'$  [Equation 1]

where $Q_m$ is the modulation order of a given transport block.

$$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH} \right)$$  [Equation 2]

where
O is the number of RI bits or HARQ-ACK bits, and
L is the number of CRC parity bits given by $$L = \begin{cases} 0 & O \leq 22 \\ 8 & \text{otherwise} \end{cases}, \text{ and}$$

$M_{sc}^{PUSCH}$ is the scheduled bandwidth for PUSCH transmission in the current subframe for the transport block, expressed as a number of subcarriers, and
$N_{symb}^{PUSCH-initial}$ is the number of SC-FDMA symbols per subframe for initial PUSCH transmission for the same transport block, and
$M_{sc}^{PUSCH-initial}$, C, K, are obtained from the initial PDCCH for the same transport block, and
For RI, $\beta_{offset}^{PUSCH} > \beta_{offset}^{RI}$, and
For HARQ-ACK, $\beta_{offset}^{PUSCH} = \beta_{offset}^{HARQ-ACK}$.

Here, $\beta_{offset}^{RI}$ may be provided at least based on some or all of the following elements (1) to (5).

Element (1): Whether the serving cell in which the PUSCH is transmitted belongs to the UCI cell group
Element (2): Whether the HARQ-ACK transmission is performed using the PUSCH
Element (3): HARQ-ACK request field value
Element (4): the number of SC-FDMA symbols for the PUSCH
Element (5): The column to which the coded modulation symbol of the RI is mapped (the SC-FDMA symbol in which the RI is transmitted)

Here, $\beta_{offset}^{RI}$ may be provided by the information/parameter received from the base station apparatus 3. The terminal apparatus may select one, at least based on some or all of the above-described elements (1) to (5), among multiple kinds of $\beta_{offset}^{RI}$ provided by the information/parameter received from the base station apparatus 3.

Here, $\beta_{offset}^{HARQ-ACK}$ may be provided by the information/parameter received from the base station apparatus 3. Additionally, $\beta_{offset}^{HARQ-ACK}$ may be provided regardless of the above-described element (1).

Hereinafter, various aspects of the terminal apparatus 1 and the base station apparatus 3 in the present embodiment will be described.

(1) A first aspect of the present embodiment is a terminal apparatus 1, the terminal apparatus includes: a receiver 10 configured to receive an uplink grant used to schedule a PUSCH; and a transmitter 10 configured to transmit, in a case that an HARQ-ACK request included in the uplink grant is set so as to trigger transmission of an HARQ-ACK, the HARQ-ACK on the PUSCH corresponding to the uplink grant, in which in a case that the uplink grant is included in a random access response, the uplink grant does not include the HARQ-ACK request.

(2) In the first aspect of the present embodiment, an uplink grant indicating retransmission of a transport block transmitted on the PUSCH for which initial transmission is scheduled by the uplink grant included in the random access response includes the HARQ-ACK request. The uplink grant indicating the retransmission of the transport block transmitted on the PUSCH for which the initial transmission is scheduled by the uplink grant included in the random access response may be transmitted on a PDCCH.

(3) In the first aspect of the present embodiment, the transmitter 10 transmits, in a case that a CSI request included in the uplink grant is set so as to trigger a CSI report, the CSI report on the PUSCH corresponding to the uplink grant, and regardless of whether the uplink grant is included in the random access response, the uplink grant includes the CSI request.

(4) In the first aspect of the present embodiment, whether the HARQ-ACK request is included in the uplink grant that is not included in the random access response is determined by a higher layer parameter. The higher layer parameter may be transmitted by the base station apparatus 3. The uplink grant that is not included in the random access response is transmitted using the PDCCH.

(5) A second aspect of the present embodiment is a base station apparatus 3, the base station apparatus includes: a transmitter 10 configured to transmit an uplink grant used to schedule a PUSCH; and a receiver 10 configured to receive, in a case that an HARQ-ACK request included in the uplink grant is set so as to trigger transmission of an HARQ-ACK, the HARQ-ACK on the PUSCH corresponding to the uplink grant, in which in a case that the uplink grant is included in a random access response, the uplink grant does not include the HARQ-ACK request.

(6) In the second aspect of the present embodiment, an uplink grant indicating retransmission of a transport block transmitted on the PUSCH for which initial transmission is scheduled by the uplink grant included in the random access response includes the HARQ-ACK request. The uplink grant indicating the retransmission of the transport block transmitted on the PUSCH for which the initial transmission is scheduled by the uplink grant included in the random access response may be transmitted on a PDCCH.

(7) In the second aspect of the present embodiment, the receiver 10 receives, in a case that a CSI request included in the uplink grant is set so as to trigger a CSI report, the CSI report on the PUSCH corresponding to the uplink grant, and regardless of whether the uplink grant is included in the random access response, the uplink grant includes the CSI request.

(8) In the second aspect of the present embodiment, whether the HARQ-ACK request is included in the uplink grant that is not included in the random access response is determined by a higher layer parameter. The higher layer parameter may be transmitted by the base station apparatus 3. The uplink grant that is not included in the random access response is transmitted using the PDCCH.

(9) In the first and second aspects of the present embodiment, the uplink grant corresponds to an LAA cell.

(10) A third aspect of the present embodiment is a terminal apparatus 1, the terminal apparatus includes: a receiver 10 configured to receive an uplink grant used to schedule a PUSCH; and a transmitter 10 configured to transmit, in a case that an HARQ-ACK request included in the uplink grant is set so as to trigger transmission of an HARQ-ACK, the HARQ-ACK on the PUSCH corresponding to the uplink grant, and configured to transmit, in a case that a CSI request included in the uplink grant is set so as to trigger a CSI report, an RI on the PUSCH corresponding to the uplink grant, in which an index of an SC-FDMA symbol in which the RI is transmitted is provided based on a value of the HARQ-ACK request.

(5) A fourth aspect of the present embodiment is a base station apparatus 3, the base station apparatus includes: a transmitter 30 configured to transmit an uplink grant used to schedule a PUSCH; and a receiver 30 configured to receive, in a case that an HARQ-ACK request included in the uplink grant is set so as to trigger transmission of an HARQ-ACK, the HARQ-ACK on the PUSCH corresponding to the uplink grant, and configured to receive, in a case that a CSI request included in the uplink grant is set so as to trigger a CSI report, an RI on the PUSCH corresponding to the uplink grant, in which an index of an SC-FDMA symbol in which the RI is transmitted is provided based on a value of the HARQ-ACK request.

(5) In the third and fourth aspect of the present embodiment, the number of coded bits of the RI is provided based on the index of the SC-FDMA symbol in which the RI is transmitted.

With this configuration, the terminal apparatus 1 can efficiently perform the uplink transmission. Additionally, the base station apparatus 3 can efficiently receive the uplink transmission.

A program running on each of the base station apparatus 3 and the terminal apparatus 1 according to an aspect of the present invention may serve as a program that controls a Central Processing Unit (CPU) and the like (a program for causing a computer to operate) in such a manner as to enable the functionalities according to the above-described embodiment of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Moreover, the terminal apparatus 1 and the base station apparatus 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" refers to a computer system built into the terminal apparatus 1 or the base station apparatus 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station apparatus 3 according to the above-described embodiment can be realized as an aggregation (a device group) constituted of multiple devices. Devices constituting the device group may be each equipped with some or all portions of each function or each functional block of the base station apparatus 3 according to the above-described embodiment. The apparatus group needs to include a complete set of functions or functional blocks of the base station apparatus 3. Furthermore, the terminal apparatus 1 according to the above-described embodiment can also communicate with the base station apparatus as the aggregation.

Furthermore, the base station apparatus 3 according to the above-described embodiment may be an Evolved Universal Terrestrial Radio Access Network (EUTRAN). Furthermore, the base station apparatus 3 according to the above-described embodiment may have some or all of the functions of a higher node than an eNodeB.

Furthermore, some or all portions of each of the terminal apparatus 1 and the base station apparatus 3 according to the above-described embodiment may be achieved as an LSI which is a typical integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication device, but the present invention is not limited to such a terminal apparatus, and is applicable to a terminal apparatus or a communication device of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, for an aspect of the present invention, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be used, for example, in a communication system, a communication apparatus (for example, mobile phone device, a base station apparatus, a wireless LAN apparatus, or a sensor device), an integrated circuit (for example, a communication chip), a program, or the like.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit 30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
a receiver configured to receive an uplink grant used to schedule a Physical Uplink Shared Channel (PUSCH), the uplink grant comprising a Hybrid Automatic Repeat reQuest-Acknowledgement (HARQ-ACK) request field and a Channel State Information (CSI) request field;
a processor configured to obtain an index based on a value of the HARQ-ACK request field, the index indicating one of Single Carrier-Frequency Division Multiple Access (SC-FDMA) symbols in the PUSCH corresponding to the uplink grant; and
a transmitter configured to:
transmit a HARQ-ACK corresponding to the uplink grant in a case that the HARQ-ACK request field is set to trigger HARQ-ACK transmission on the PUSCH; and
transmit, based on the index, a Rank Indicator (RI) on the one of the SC-FDMA symbols in the PUSCH corresponding to the uplink grant in a case that the CSI request field is set to trigger a CSI report.

2. The terminal apparatus according to claim 1, wherein the processor is further configured to calculate a number of coded bits of the RI based on the index.

3. A base station apparatus comprising:
a transmitter configured to transmit an uplink grant used to schedule a Physical Uplink Shared Channel (PUSCH), the uplink grant comprising a Hybrid Automatic Repeat reQuest-Acknowledgement (HARQ-ACK) request field and a Channel State Information (CSI) request field, the HARQ-ACK request field including a value; and
a receiver configured to:
receive a HARQ-ACK corresponding to the uplink grant when the HARQ-ACK request field is set to trigger HARQ-ACK transmission on the PUSCH;
receive, based on an index, a Rank Indicator (RI) on one of SC-FDMA symbols in the PUSCH corresponding to the uplink grant when the CSI request field is set to trigger a CSI report,
wherein the index indicates the one of the SC-FDMA symbols in the PUSCH and is calculated based on the value of the HARQ-ACK request field.

4. The base station apparatus according to claim 3, wherein a number of coded bits of the RI is calculated based on the index.

5. A communication method for a terminal apparatus, the communication method comprising:
receiving an uplink grant used to schedule a Physical Uplink Shared Channel (PUSCH), the uplink grant comprising a Hybrid Automatic Repeat reQuest-Acknowledgement (HARQ-ACK) request field and a Channel State Information (CSI) request field;
obtaining an index based on a value of the HARQ-ACK request field, the index indicating one of Single Carrier-Frequency Division Multiple Access (SC-FDMA) symbols in the PUSCH corresponding to the uplink grant;
transmitting a HARQ-ACK corresponding to the uplink grant in a case that the HARQ-ACK request field is set to trigger HARQ-ACK transmission on the PUSCH; and
transmitting, based on the index, a Rank Indicator (RI) on the one of the SC-FDMA symbols in the PUSCH corresponding to the uplink grant in a case that the CSI request field is set to trigger a CSI report.

6. The communication method according to claim 5, further comprising:
calculating a number of coded bits of the RI based on the index.

7. A communication method for a base station apparatus, the communication method comprising:
transmitting an uplink grant used to schedule a Physical Uplink Shared Channel (PUSCH), the uplink grant comprising a Hybrid Automatic Repeat reQuest-Acknowledgement (HARQ-ACK) request field and a Channel State Information (CSI) request field, the HARQ-ACK request field including a value;
receiving a HARQ-ACK corresponding to the uplink grant when the HARQ-ACK request field is set to trigger HARQ-ACK transmission on the PUSCH; and
receiving, based on an index, a Rank Indicator (RI) on one of SC-FDMA symbols in the PUSCH corresponding to the uplink grant when the CSI request field is set to trigger a CSI report,
wherein the index indicates the one of the SC-FDMA symbols in the PUSCH and is calculated based on the value of the HARQ-ACK request field.

8. The communication method according to claim 7, wherein a number of coded bits of the RI is calculated based on the index.

9. The terminal apparatus according to claim 1, wherein the processor is further configured to calculate a number of coded bits of the RI based on a modulation order of a transport block and the transport block is transmitted on the PUSCH.

10. The terminal apparatus according to claim 1, wherein the processor is further configured to calculate a number of coded bits of the RI based on a number of cyclic redundancy check (CRC) parity bits and the CRC parity bits are transmitted on the PUSCH.

11. The terminal apparatus according to claim 1, wherein the processor is further configured to calculate a number of coded bits of the RI based on a bandwidth of the PUSCH.

12. The terminal apparatus according to claim 1, wherein the processor is further configured to calculate a number of coded bits of the RI based on an offset value and the offset value is determined based on at least one of:
whether the PUSCH is in a cell belonging to a cell group, the cell group comprising a plurality of licensed assisted access cells;
whether the HARQ transmission is on the PUSCH;
the value of the HARQ-ACK request field; or
a number of the SC-FDMA symbols in the PUSCH.

13. The base station apparatus according to claim 3, wherein a number of coded bits of the RI is calculated based on a modulation order of a transport block and the transport block is transmitted on the PUSCH.

14. The base station apparatus according to claim 3, wherein a number of coded bits of the RI is calculated based on a number of cyclic redundancy check (CRC) parity bits and the CRC parity bits are transmitted on the PUSCH.

15. The base station apparatus according to claim 3, wherein a number of coded bits of the RI is calculated based on a bandwidth of the PUSCH.

16. The base station apparatus according to claim 3, wherein a number of coded bits of the RI is calculated based on an offset value and the offset value is determined based on at least one of:

whether the PUSCH is in a cell belonging to a cell group, the cell group comprising a plurality of licensed assisted access cells;

whether the HARQ transmission is on the PUSCH;

the value of the HARQ-ACK request field; or a number of the SC-FDMA symbols in the PUSCH.

17. The communication method according to claim 5, further comprising:

calculating a number of coded bits of the RI based on a number of cyclic redundancy check (CRC) parity bits, wherein the CRC parity bits are transmitted on the PUSCH.

18. The communication method according to claim 5, further comprising:

calculating a number of coded bits of the RI based on an offset value, wherein the offset value is determined based on at least one of:

whether the PUSCH is in a cell belonging to a cell group, the cell group comprising a plurality of licensed assisted access cells;

whether the HARQ transmission is on the PUSCH;

the value of the HARQ-ACK request field; or a number of the SC-FDMA symbols in the PUSCH.

19. The communication method according to claim 7, wherein a number of coded bits of the RI is calculated based on a number of cyclic redundancy check (CRC) parity bits and the CRC parity bits are transmitted on the PUSCH.

20. The communication method according to claim 7, wherein a number of coded bits of the RI is calculated based on an offset value and the offset value is determined based on at least one of:

whether the PUSCH is in a cell belonging to a cell group, the cell group comprising a plurality of licensed assisted access cells;

whether the HARQ transmission is on the PUSCH;

the value of the HARQ-ACK request field; or a number of the SC-FDMA symbols in the PUSCH.

\* \* \* \* \*